US007143101B2

(12) United States Patent
Oliver et al.

(10) Patent No.: US 7,143,101 B2
(45) Date of Patent: Nov. 28, 2006

(54) METHOD AND APPARATUS FOR SELF-DESCRIBING EXTERNALLY DEFINED DATA STRUCTURES

(76) Inventors: Andy Oliver, 7560 Penobscot Dr., West Hills, CA (US) 91304; Joe Perches, 2416 33rd St., Santa Monica, CA (US) 90405

( * ) Notice: Subject to any disclaimer, the term of this patent is extended or adjusted under 35 U.S.C. 154(b) by 395 days.

(21) Appl. No.: 10/418,957

(22) Filed: Apr. 18, 2003
(Under 37 CFR 1.47)

(65) Prior Publication Data
US 2004/0210554 A1 Oct. 21, 2004

(51) Int. Cl.
*G06F 17/30* (2006.01)
(52) U.S. Cl. .................. 707/101; 707/101; 707/103 R; 715/749; 717/108; 717/118; 717/139; 717/148
(58) Field of Classification Search .................... 707/1, 707/102
See application file for complete search history.

(56) References Cited

U.S. PATENT DOCUMENTS

| 2002/0059566 A1* | 5/2002 | Delcambre et al. | 717/146 |
| 2003/0055806 A1* | 3/2003 | Wong et al. | 707/1 |
| 2003/0172368 A1* | 9/2003 | Alumbaugh et al. | 717/106 |
| 2004/0083196 A1* | 4/2004 | Reasor et al | 707/1 |

\* cited by examiner

*Primary Examiner*—Jean M. Corrielus
(74) *Attorney, Agent, or Firm*—The Hecker Law Group, PLC

(57) ABSTRACT

Embodiments of the invention provide a framework for computer application to utilize data structures by loading externally-defined container data structures, and building in-memory representation of data structures at runtime. Contrary to existing applications, computer applications implementing the invention may utilize data structures for which the architecture is not embedded within the application code. Embodiments of the invention provide mechanisms by which applications (or components thereof) implementing the invention may access and modify data structures and their individual elements.

38 Claims, 3 Drawing Sheets

METHOD AND APPARATUS FOR SELF-DESCRIBING EXTERNALLY DEFINED DATA STRUCTURES

FIELD OF THE INVENTION

The invention has application in the field of building software applications. More particularly, the invention is directed at providing a method and apparatus for building computer programs applications utilizing a self-describing externally defined container data structures.

BACKGROUND

In a typical computer program, the architecture of the in-memory data representation is provided within the binary code (or bytecode) which a compiler produces by compiling the program's source code. Modern programs are almost all written in a high level programming language. A variety of languages exist, and allow programmers to write code a in human-friendly syntax. Examples of programming languages are C/C++, PASCAL, FORTRAN, ADA etc. A high level language essentially provides an easy to read and write syntax for describing computing operations. Furthermore, some high level languages (e.g. C++ and JAVA) may implement object oriented concepts such as the concept of objects itself, the concept of inheritance etc. Object oriented concepts allow programmers to design better data storage architectures, and implement code that is easy to manipulate and reuse.

Every high-level based source code has to be compiled with a compiler. A compiler analyzes the source code and generates executable code that computers are able to execute. However, not every high-level programming language is destined to be executed directly by a machine. For example, the JAVA programming language may be compiled into bytecode that is then run by a JAVA virtual machine, which is a computer program capable of translation bytecode into machine specific execution instructions. Other high-level programming languages are designed to be interpreted at run time. For example, the PERL and SHELL provide scripting languages. The programs are interpreted at run time by an interpreter.

Whether a programming language is destined to be compiled, translated or interpreted, the steps for declaring data architecture and creating associating computing operations with the data almost always follows the same path: the programmer inputs all the definitions of the data and the association with operations in the source code, and the high-level instructions are translated into computer executable instructions. For example, a variable may be declared with a name and a type in the source. The compiler reads the variable declaration in the source code and generates executable code that reserves a memory space of a predetermined size, and executable code for generating the memory location address. The size of the memory allocated during execution, is determined by one or both of two factors. First, the programming language may have a standard definition of the basic data types, and second the data size may depend on the hardware architecture of each platform. Hence, integers that may be represented by sixteen (16) bits (two bytes) on one hardware platform and by thirty two (32) bits (four bytes) on a different hardware architecture.

Data declarations in computer programs typically define variable names their type and sometimes their positions in relation to each other. Several concepts are implemented in existing high-level programming languages. At the basic level, a data structure may consist of a simple variable (e.g. an integer) implemented through a name and a size, or through a complex description of data entities. Examples of higher-level data descriptions include arrays, data structures and objects. Arrays are ensembles of equally sized memory spaces represented in the computer memory by a contiguous space of memory where each location can be addressed individually or using an offset from the beginning of the array using one or multiple dimensions schemes. Complex data structures contain data of different sizes, each of which may be addressed using an offset from the beginning of the data structure using pointers. Objects typically include data declarations and code for manipulating the data.

In existing programming schemes, a computer application must always include the definition declarations of the data in the source code in order to be included in the binary code. The obvious shortcoming of this approach is that the architecture of data structures may not be changed in the executable code. If a change is to be applied to the structure of the data, the source code has to be modified, and compiled de novo to generate executable code capable of representing the data.

Therefore, there is a need for a method that allows data manipulation in computer programs without involving the process of generating the executable code.

SUMMARY OF THE INVENTION

Embodiments of the invention provide a framework enabling computer programs to utilize externally-defined self-describing container data structures. Externally-defined container data structures enable applications embodying the invention to load descriptions from files external to the application, utilize the descriptions to build an in-memory representation of data structures, and provide a mechanism to communicate with the in-memory data structures (or portions thereof from one or more application processes.

Embodiments of the invention utilize the extensible markup language to provide external descriptions of container data structures. Container data structures provide descriptions of one or more data elements. Each data element is referenced by a name and one or more property descriptions. Properties are, in one or more embodiments of the invention, utilized to define attributes associated with the data element. Properties may define a valid set of values for a data element, a valid range of values, a type of data (e.g. Integer, string and other data types) and any other property required to define a data element.

In contrary to existing inventions where the data architecture is built into the application, the invention provides a framework for building applications that may not comprise the data structure descriptions, and load the data structures utilizing the container data structures. Embodiments of the invention, utilize an engine comprising a set of tools capable of communicating with applications that implement one or more application programming interfaces for using container data structures. The engine provides the capability of loading and parsing description files. The engine also provide access to the data structures following data access requests from applications (or components thereof), and provide a mechanism for notifying applications or components thereof of events involving data structures. The engine in embodiments of the invention provides access to the values, the properties and names of the data in the structures. The engine provides, in addition to accessing the data, the ability to restrict data structure manipulations. For example, access to the data in the structures may be allowed following access limits (or rules) defined in external files.

DETAILED DESCRIPTION

The invention discloses a method and apparatus for providing externally-defined container data structures. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Throughout the following disclosure, the reference to a user is alternately used to refer to a person using a computer application and/or to one or more automatic processes.

Figure 1:
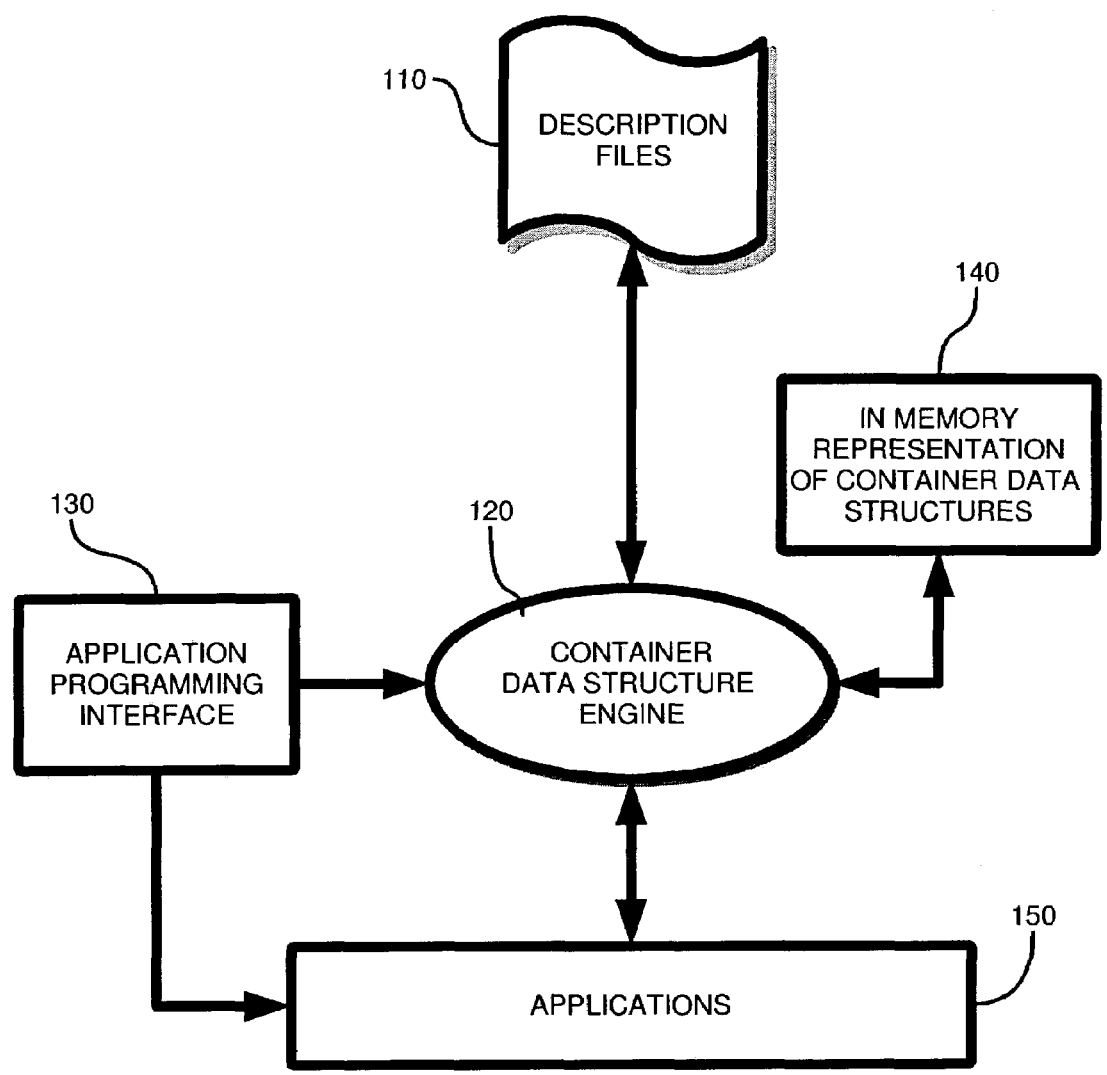
FIG. 1 is a block diagram representing overall software architecture in accordance with one or more embodiments of the invention.

FIG. 1 is a block diagram representing overall software architecture in accordance with one or more embodiments of the invention. In embodiments of the invention, description files 110 comprise one or more data sources. A data source may be a flat file, a relational database system a network data stream or any other means allowing a computing system to obtain data. A description file contains descriptions of one or more container data structures. A container data structure refers to a data entity (e.g. data structure) that contains all the information about the data entity allowing a system implementing the invention to build an in-memory representation of the data structure, and implement functionality to control data handling processes.

Embodiments of the invention implement a container data structure engine 120. The container data structure engine provides a set of tools that allow one or more applications 150 to create an in-memory representation of data 140. Embodiments of the invention also provide an application programming interface 130 which the application and the engine implement to provide the capability to load description files, create the in-memory representation of the data and handle the data input and output transactions.

The description files 110 contain a self-describing hierarchical data structure that provides information about properties for each data structure and each level of the hierarchy. Such a structure holds properties and descriptions of other structures. In embodiments of the invention a property is comprised of a name and value. Each structure and its subsidiary structures form a tree of structures. The tree contains a root structure which contains, directly or indirectly, all other structures in the tree. Thus, given only a reference to the root structure in such a tree, all other structures can be reached, and all properties contained in those structures can be found and their values inspected. In the present disclosure, the term "schema" is used to refer to the description of structures contents and relationships. The description may be defined in external data files.

In embodiments of the invention, the self-describing container data structures contain properties and other structures. Properties may be in the form of name/value pairs, for example. Each property has a type that defines whether it is numeric, text or any other type defined in one or more standard definitions or custom built. Properties may describe a variety of attributes associated with the data. For example, properties may describe range limits of numerical values, maxima and minima or any other data property. Furthermore, every datum may have a fixed number of allowed values. Structures that are defined by a schema may have a fixed list of properties given in the schema.

In embodiments of the invention, the approach to building container data structures is extensible: new structure types and their relationships can be supported without changes to the interface or implementation. The interface allows all data structure manipulations, including construction and assignment provided in the schema.

In embodiments of the invention, the schema defines hierarchy constraints such as which structures may be allowed to be children of other which other structures, and the number of structures of a specified type in each substructure. For example, structures that contain other structures are built under the constraints defined in the schema.

Structure definitions comprise:
Structure name
Properties contained in the structure
Relationships to other structures
Property definitions comprised
Property name
Property type
Default Values Optionally, either List of allowed values or Minimum/Maximum values Property names, values, and limits can be inspected at runtime. The Application Programming Interface 130 provides functions that allow the list of property names to be retrieved. For each property name, another function allows the value of the property to be retrieved. Each property may also be associated with one or more attributes defining the mechanisms for accessing the data in the structure at runtime. For example, the attributes may define how the engine is to handle broadcasting and/or hiding the values of a given property.

Embodiments of the invention provide the capability to determine the child to parent relationships in hierarchical structures at runtime. One or more functions in the Application Programming Interface allow for building and inspecting hierarchical structures.

The descriptions of the container data structures and their hierarchical relationships are interpreted to create the in-memory representations of data structures that support applications embodying the invention.

Embodiments of the invention may utilize the Extensible Markup Language (XML) standard to build description files. In the following a brief description of a few aspects of the Extensible Markup Language is provided to guide the reader.

Extensible Markup Language (XML) is a human-readable, machine-understandable, general syntax for describing hierarchical data. XML is an open standard for describing data developed under the auspices by the World Wide Web Consortium (W3C). XML is a subset of the Standard Generalized Markup Language (SGML) defined in ISO standard 8879:1986. XML is a formal language that can be used to pass information about the component parts of a document from one computer system to another. XML is used to describe any logical text structure (e.g. form, book, database etc.). XML is based on the concept of documents composed of a series of entities. Each entity can contain one or more logical elements. Each of these elements can have certain attributes (properties) that describe the way in which it is to be processed. XML also provides a formal syntax for describing the relationships between the entities, elements and attributes that make up an XML document, such a syntax can be used to recognize component parts of each document.

XML differs from other markup languages in that it does not simply indicate where a change of appearance occurs, or where a new element starts. XML clearly identifies the boundaries of every part of a document, (e.g. whether a text block is new chapter, or a reference to another publication). XML uses custom tags enabling applications to define, transmit, validate and interpret data shared between applications and between organizations.

To allow a computer to check the structure of a document, users must provide it with a document type definition that declares each of the permitted entities, elements and attributes, and the relationships between them. By defining the role of each element of text in a formal model, known as a Document Type Definition (DTD), users of XML can check that each component of document occurs in a valid place within the interchanged data stream. An XML DTD allows computers to check, for example, that users do not accidentally enter a third-level heading without first having entered a second-level heading, something that cannot be checked using the HyperText Markup Language (HTML) previously used to code documents that form part of the World Wide Web (WWW) of documents accessible through the Internet. However, XML does not restrict users to using DTDs.

To use a set of markup tags that has been defined by a trade association or similar body, users need to know how the markup tags are delimited from normal text and in which order the various elements should be used. Systems that understand XML can provide users with lists of the elements that are valid at each point in the document, and will automatically add the required delimiters to the name to produce a markup tag. Where the data capture system does not understand XML, users can enter the XML tags manually for later validation. Elements and their attributes are entered between matched pairs of angle brackets (< . . . >) while entity references start with an ampersand and end with a semicolon (& . . . ;).

Because XML tag sets are based on the logical structure of the document they are somewhat easier to understand than physically based markup schemes of the type typically provided by word processors. As an example, a memorandum coded in XML might look as follows:

```
<memo>
<to>All staff</to>
<from>R. Michael</from>
<date>April 1, 2001</date>
<subject>Power Saving</subject>
<text>Please turn off your desktops before you leave.</text>
</memo>
```

As shown in the example above, the start and end of each logical element of the file has been clearly identified by entry of a start-tag (e.g. <to>) and an end-tag (e.g. </to>). This formatting is ideal for a computer to follow, and therefore for data processing.

To define tag sets users may create a Document Type Definition that formally identifies the relationships between the various elements that form their documents. For the simple memorandum example, the XML DTD might take the form:

```
<!DOCTYPE memo [
<!ELEMENT memo    (to, from, date, subject?, para+) >
<!ELEMENT para    (#PCDATA) >
<!ELEMENT to      (#PCDATA) >
<!ELEMENT from    (#PCDATA) >
<!ELEMENT date    (#PCDATA) >
<!ELEMENT subject (#PCDATA) >
]>
```

This model indicates that a memorandum consists of a sequence of header elements, <to>, <from>, <date> and, optionally, <subject>, which must be followed by the contents of the memorandum. The content of the memo defined in this simple example is made up of a number of paragraphs, at least one of which must be present (this is indicated by the + immediately after para). In this simplified example a paragraph has been defined as a leaf node that can contain parsed character data (#PCDATA), i.e. data that has been checked to ensure that it contains no unrecognized markup strings.

XML-coded files are suitable for communicating data to be stored in databases. Because XML files are both object-orientated and hierarchical in nature they can be adapted to many types of databases. A standardized interface to XML data is defined through W3C's Document Object Model (DOM), which provides a Common Object Request Broker Architecture (CORBA) interface definition language (IDL) interface between applications exchanging XML data.

XML validation and well formedness can be checked using XML processors to which it is commonly referred as XML parsers. An XML processor parser checks whether an XML document is valid by checking that all components are present, and the document instance conforms to the rules defined in the DTD. An up-to-date version of the XML/DTD is available on the World Wide Web Consortium web site URL<http://www.w3.org>.

The following XML code is provided with the following explanations are provided to illustrate a schema as utilized in embodiments of the invention.

```
<?xml version="1.0" encoding="UTF-8"?>
<!ELEMENT Schema (SchemaType+, StructureTemplate*)>
<!ATTLIST Schema name CDATA #REQUIRED
windowed (true|false) "false">
<!ELEMENT SchemaType EMPTY>
<!ATTLIST SchemaType name (Current|Persistent|
Requested) "Persistent">
<!ELEMENT StructureTemplate (StructureName,
                             Description?,
                             PrimaryKey,
                             Property*,
                             Relation*,
                             StructureRef*,
                             StructureTemplate*)>
<!ATTLIST StructureTemplate parentRelationType CDATA "NULL"
            command (true|false) "false"
            buckets    CDATA    "1">
<!ELEMENT StructureName (#PCDATA)>
<!ATTLIST StructureName schemaName CDATA #IMPLIED>
<!ELEMENT SchemaName (#PCDATA)>
<!ELEMENT PrimaryKey (Property)>
```

-continued

```
<!ELEMENT Relation (ForeignKey | ForeignKeyTemplate)+ >
<!ATTLIST Relation name      CDATA
                             #REQUIRED
                  cardinality (one-to-one|
                  many-to-one|zero-one-to-one|
                  zero-many-to-one) "one-to-one"
                  direction   (up|down)
                  "up"
                  maximum   CDATA
                  #IMPLIED
                  defaultChildCount      CDATA      "0">
<!ELEMENT StructureRef (StructureName)>
<!ELEMENT ForeignKey (StructureName)>
<!ELEMENT ForeignKeyTemplate (StructureNameTemplate)>
<!ATTLIST ForeignKeyTemplate relationType CDATA #REQUIRED>
<!ELEMENT StructureNameTemplate EMPTY >
<!ATTLIST StructureNameTemplate name   CDATA   #IMPLIED>
<!ELEMENT PropertyTemplate EMPTY >
<!ATTLIST PropertyTemplate   name       CDATA   #IMPLIED
                  type        CDATA      #IMPLIED
                  count       CDATA      #IMPLIED
                  visible     CDATA      #IMPLIED>
<!ELEMENT Property (Description?,
                  EnumeratedValue*,
                  MinValue?,
                  MaxValue?,
                  ForcedValue?,
                  DefaultValue?)>
<!ATTLIST Property name        CDATA     #REQUIRED
                  type        CDATA     #REQUIRED
                  count       CDATA     "1"
                  visible     (true|false)   "true"
                  sortable    (true|false)   "false">
<!ELEMENT DefaultValue (#PCDATA)>
<!ELEMENT MinValue (#PCDATA)>
<!ELEMENT MaxValue (#PCDATA)>
<!ELEMENT EnumeratedValue (#PCDATA)>
<!ELEMENT ForcedValue (#PCDATA)>
<!-- end of $Workfile: Schema.dtd $ -->
```

The following explanations comment on each field in the above source code.

Schema
  The root element for a schema description file that defines the structural representation for native application. Every schema description XML file that specifies this file as the DTD must have the Schema element as the root element.

Contents:
  StructureTemplate Defines the organizational Structure-Template of the schema description. The schema will contain zero or more of these StructureTemplates.

Attributes:
  name: The name of this schema. It is used to distinguish the tables of this schema from those in another schema.

SchemaType
  Defines the variation of schema, which translates to the prefix of the table names for each StructureTemplate within the schema. The SchemaType has a name attribute which is enumerated with allowable values of Current, Persistent or Requested.

Contents:
  none.

Attributes:
  name The name of this schema type. Allowable values are Current, Persistent or Requested StructureTemplate
  Defines a collection of related properties. This is used to specify the format of a table in the relational database.

Contents:
  StructureName The name of the SchemaStructure. It is used as the table name in the database.
  PrimaryKey Uniquely identifies each row in a relational database table.
  Property Defines an individual column in the table. There may be zero or more of these elements.
  Relation A mapping between the SchemaStructure where it is defined and another SchemaStructure. There may be zero or more of these elements.
  StructureRef a link to a sub-structure that may appear inside the StructureTemplate element where it is defined. this allows duplicate definitions to be avoided in a schema definition.
  StructureTemplate Sub-StructureTemplates that may appear inside the StructureTemplate element where it is defined.

Attributes:
  parentRelationType Type of base StructureTemplate of which this StructureTemplate is a derived version.

StructureName
  The name of a StructureTemplate. The value is specified using parsed character data.
  The Optional schemaName attribute, when defined, identifies the schema in which the corresponding Structure-Template, identified by StructureName, is defined.

SchemaName
  The name of the schema in which the StructureTemplate in the ForeignKey is defined. The value is specified using parsed character data.

PrimaryKey
  A unique identifier for a given instance of an object/row in a database table.

Contents:
  Property The actual value that is used as the unique identifier for the object/row in the database table. There are one or more of them in the primary key. Each one will result in a column in the database.

Relation
  Defines how two tables, usually different, are associated.

Contents:
  ForeignKey Refers to an instance of an object in a, usually different, table.
  ForeignKeyTemplate A description of the format that a foreign key must follow.

Attributes:
  name The name of this relation. It is used as the column name in the database table. cardinality Specifies how many instances of the object in which the relation is specified are related to a given instance of the objects specified in the relation. There are four allowed values: one-to-one, zero-one-to-one, many-to-one and zero-many-to-one. Cardinality of one-to-one means that only one instance of the StructureTemplate in which the relation is specified is related to a given instance of the StructureTemplate identified by the relation, and the relation must occur. Cardinality of many-to-one means that one or more instance of the StructureTemplate in which the relation is specified is related to a given instance of the StructureTemplate, and the relation must occur. The 'zero-' variations of cardinality specify that the relation is optional. Thus, when the foreign keys are mapped into columns in the database table, the 'zero-' variations will allow NULL values in the columns, but the one-to-one and many-to-one will not allow NULL values.

direction Direction can have values of 'up' or 'down'. Down indicates that the relation points from the Structure to a sub-Structure. Up indicates from sub-Structure to its parent Structure.

maximum If cardinality is many-to-one or zero-many-to-one, this specifies the maximum number of instances in the 'many' side of the relation that can be related to a given instance of the 'one' side of the relation. Optional.

StructureRef
    acts as a place holder for the StructureTemplate specified by StructureName. this allows duplicate definitions to be avoided in a schema description. an analogy would be a C preprocessor macro. it may be used in multiple places, but is defined in a single place. if the definition is changed, the modification is propagated to all uses.

Contents:
    StructureName The name of the table this key references. For each primary key column in the specified table, a column in the table where the foreign key is defined is created.

ForeignKey
    Refers to an instance of an object in the specified table.

Contents:
    StructureName The name of the table this key references. For each primary key column in the specified table, a column in the table where the foreign key is defined is created.

ForeignKeyTemplate
    Defines the structure of a ForeignKey to use when the actual sub-structure is not known. All sub-structures must have primary keys in the specified format.

Contents:
    StructureNameTemplate A placeholder for a structure name in the relation containing this ForeignKeyTemplate.

Attributes:
    relationType Specifies the base type for a base class—derived class relationship. All derived class StructureTemplates must have the same value in the parentRelationType attribute.

StructureNameTemplate
    A placeholder for a structure name in a relation. A column will be created in the table of the StructureTemplate that contains the relation in which the ForeignKeyTemplate is defined. The column will contain the StructureName (table name) values of the derived classes (StructureTemplates) of the base class (StructureTemplate) in which the relation is defined. Valid StructureTemplate, names will be determined by the parentRelationType attribute value in all derived structures having the same value as the relationType attribute in the ForeignKeyTemplate.

Attributes:
    name name for the group of structures to which the ForeignKeyTemplate can refer.

PropertyTemplate
    A generalized single attribute. Usually used in describing the format of other objects.

Attributes:
    name A name to identify this property by (SourceMac, Gap).
    type Specifies the kinds of values the property may have.
    count The number of 'type' objects contained in this property.
    visible Whether this property should be shown to end users.

Property
    A generalized single attribute.

Contents:
    EnumeratedValue A list of the values the property may hold.
    MinValue The optional minimum value the property may hold.
    MaxValue The optional maximum value the property may hold.
    ForcedValue The value that a property is forced to.
    DefaultValue The optional default value of the property.

Attributes:
    name A name to identify this property by (SourceMac, Gap).
    type Specifies the kinds of values the property may have.
    count The number of 'type' objects contained in this property.
    visible Whether this property should be shown to end users.
    sortable Whether this property will be used to sort instances of structures containing this property—the database table for structures containing this property will have an index created for the column corresponding to this property if the sortable value is true.

DefaultValue
    The value assigned to a property if no other is specified. The value is specified using parsed character data.

MinValue
    The minimum value a property may have. The value is specified using parsed character data.

MaxValue
    The maximum value a property may have. The value is specified using parsed character data.

EnumeratedValue
    The values which may be assigned to a property. The value is specified using parsed character data.

ForcedValue
    A value assigned to a property by TestCenter. This value supersedes all other values. UIs and TestCenter must prevent this value from being altered.

Figure 2:
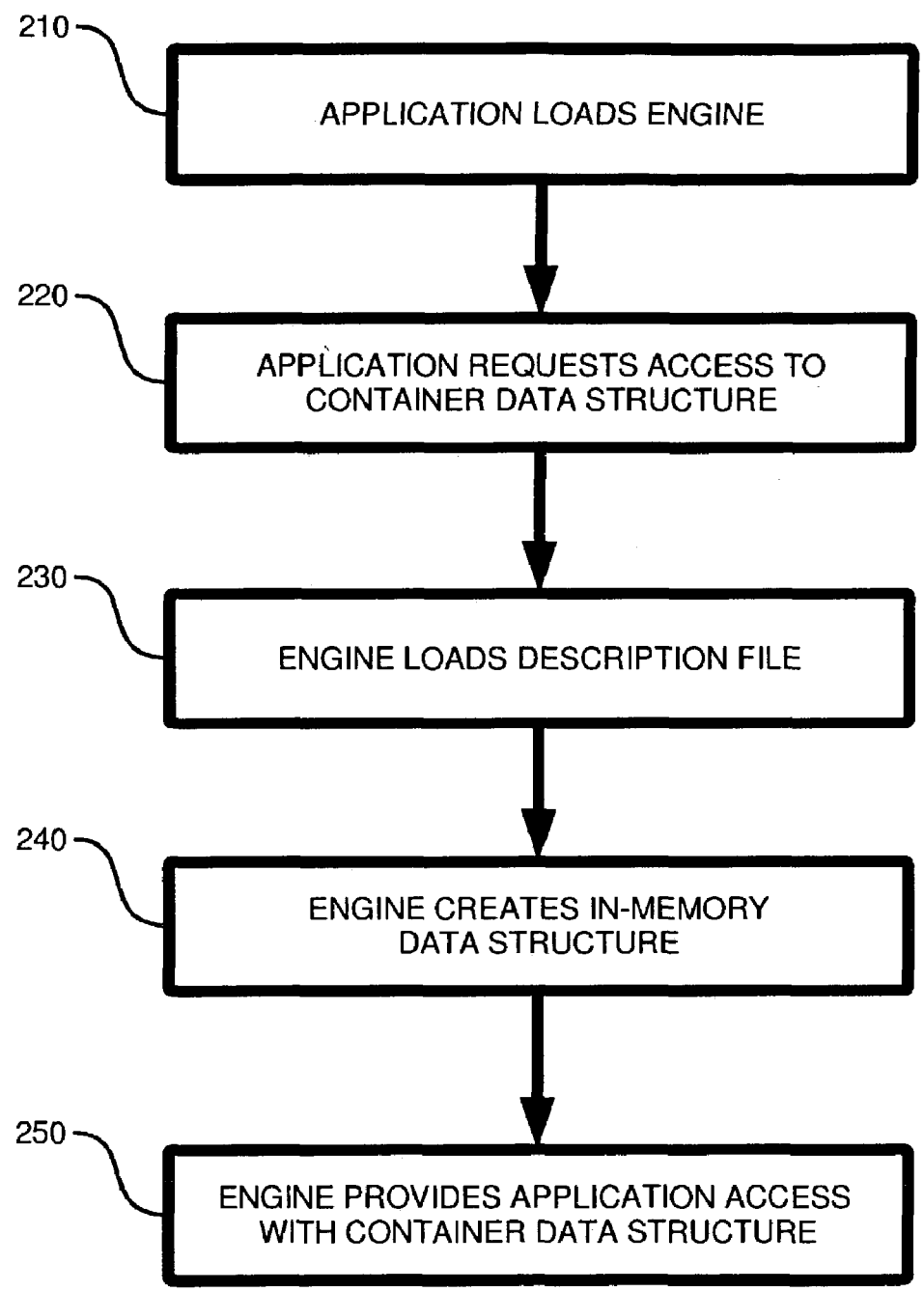
FIG. 2 is a flowchart illustrating steps involved in utilizing container data structures in accordance with embodiments of the invention.

FIG. 2 is a flowchart illustrating steps involved in utilizing container data structures in accordance with embodiments of the invention. At step 210, a typical computer application embodying the invention (e.g. 150) loads a container data structure engine. The engine is comprised of a set of tools that may be independently loaded from one or more library files or accessed through a socket (e.g. remote procedure calls). The engine may also be a stand-alone or embedded application that may communicate with the rest of the application's components. The application typically implements a set of (or a the whole) application programming interface 130, that allows the application to communicate with the engine.

At step 220, the application requests access to the data. The request may be issued following the application process of loading external data, or creating in-memory representation of data structure for further use. The application may issue a request to access data structures following a user's input to create one or more data objects. In embodiments of the invention, the application may have one or more separate processes running simultaneously.

In embodiments of the invention, each component of the application issuing a request to access data, also provides a handle (e.g. an identifier or an address to the component) that may be utilized by the engine's components to communicate back to the application's components. For example, an application component may access a data structure and needs to be notified if and when the data has been modified (e.g. by a different component). The application component passes to the engine a handle that enables the engine to call a specific procedure in the application component. In the framework of object oriented programming, the component may implement a listener and the handle to the listener is passed to the engine broadcast component to notify the listener when and if a datum is modified.

At step 230, the engine loads the container data structure description files. The latter step involves loading one or more description files, parsing the description, conducting several syntactic and logical checks, and translating one or more container data structures into one or more in-memory representations of data structures. At step 240, the engine creates the in-memory representation of one or more data structures. The memory is allocated to each structure based on the properties and hierarchical descriptions. At step 250, the engine provides application components access to the data structures by returning the output of specialized functions for handling input and output to each of the properties.

Figure 3:
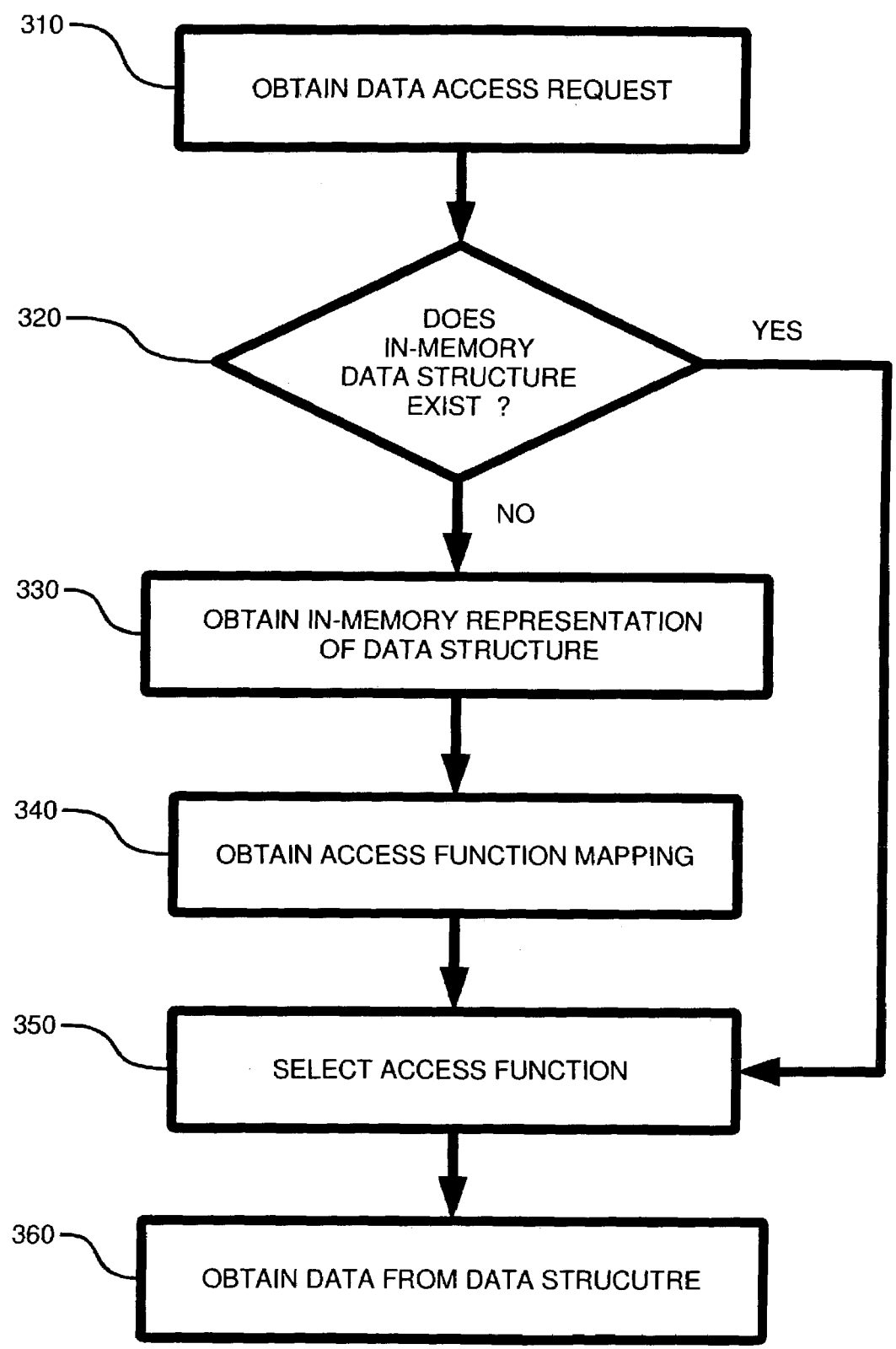
FIG. 3 is a flowchart illustrating steps involved in loading and handling data input and output request in applications embodying the invention.

FIG. 3 is a flowchart illustrating steps involved in loading and handling data input and output request in applications embodying the invention. At step 310, a system embodying the invention obtains a request for data access. The request may be any type of data access. An application may require the creation of a new in-memory representation of one or more data structures. An application may request access to a data structure of part thereof, or an application may require access to modify a data values previously retrieved. At step 320, a system embodying the invention checks whether a data structure to be accessed in available in memory. If the data is not available in memory, the system proceeds to check whether an in-memory data structure is to created. At step 330, the system obtains an in-memory representation of one or more data structures. The latter step involves loading description files, parsing the description files (e.g. using an Extensible Markup Language parser), analyzing the hierarchical structure for each container data structure, allocating memory for each component of the in-memory representation, and storing the location reference of each component to be accessed to retrieve and modify data. At step 340, a system embodying the invention obtains a mapping for each data component to one or more functions for accessing and handling the data. For example, if a data has a property of an integer number, thus allowing only numeric characters and no floating point, the system associates one or more functions to check the integrity of the values. The latter functions may handle checking that the value of a datum is within a valid range, triggering an error message and selecting the target process to report error message, and perform all data handling necessary to store, retrieve and modify the data. At step 350, in the case of a request to access data, the system selects the access functions previously associated with data and makes a call to the said function. At step 360, the system accesses the data structure to obtain the data requested by an application component. At the latter step, the system also performs one or more steps for validating data dependencies and permissions. The engine is designed to handle a locking mechanism for handling access to different parts of any data structure. The engine may keep a list of application components that have accessed a data and provide read and/or write access to other application components. In embodiments of the invention, applications are written in object oriented programming languages and the functions are implemented using a synchronization mechanism, thus allowing only one function at a time to modify the data, while access requests from other components are queued to be handled serially.

Thus, a method and apparatus for implementing container data structures that provide a self-describing externally define mechanism for creating and handling data structures.

The invention claimed is:

1. A method for providing externally defined self-describing container data structures comprising:

executing a data structure engine in a computer system;

said data structure engine obtaining at least one description set for at least one container data structure;

said data structure engine obtaining at least one data structure in-memory representation in said computer system by interpreting said at least one container data structure;

said data structure engine obtaining a mapping between one or more data elements of said at least one data structure and at least one function;

said data structure engine handling access to said one or more data elements from one or more applications to read and write said one or more data elements; and in response to a change in value of a first data element of said at least one data structure in-memory representation, said data structure engine using one or more application component handles associated with said first data element to notify one or more respective components of said one or more applications that said change has occurred.

2. The method of claim 1 wherein said at least one description set comprises an extensible markup language based description set.

3. The method of claim 1 wherein said obtaining at least one description set comprises parsing at least one description file.

4. The method of claim 1 wherein said obtaining at least one description set comprises analyzing the hierarchical structure of said container data structure.

5. The method of claim 1 wherein said at least one container data structure comprises obtaining a plurality of properties associated with said at least one container data structure.

6. The method of claim 5 wherein said plurality of properties comprises a plurality of name-value pairs.

7. The method of claim 5 wherein said plurality of properties comprises a property definition for each one of said plurality of properties.

8. The method of claim 7 wherein said property definition comprises a definition for a range of valid values.

9. The method of claim 7 wherein said property definition comprises a definition for a maximum value.

10. The method of claim 7 wherein said property definition comprises a definition for a minimum value.

11. The method of claim 7 wherein said property definition comprises a definition for a type of a variable.

12. The method of claim 1 wherein said at least one container data structure comprises a hierarchical structure.

13. The method of claim 1 wherein said obtaining said mapping comprises associating at least one handler function with each of said one or more data elements.

14. The method of claim 13 wherein said at least one handler function comprises at least one function for reading the value of said one or more data elements.

15. The method of claim 13 wherein said at least one handler function comprises at least one function for writing the value of said one or more data elements.

16. The method of claim 13 wherein said at least one handler function comprises at least one function for handling variable type checks of said one or more data elements.

17. The method of claim 13 wherein said at least one handler function comprises at least one function for checking access permissions to said one or more data elements.

18. The method of claim 1 wherein said handling access to said one or more data elements comprises obtaining a reference from an application accessing said one or more data element.

19. The method of claim 1 wherein said handling access to said one or more data elements comprises notifying applications when said one or more data elements are modified.

20. A computer program product comprising:
a memory medium having computer readable program code for providing externally defined self-describing container data structures embodied therein, said computer readable program code configured to:
obtain at least one description set for at least one container data structure;
obtain at least one data structure in-memory representation by interpreting said at least one container data structure;
obtain a mapping between one or more data elements of said at least one data structure and at least one function;
handle access to said one or more data elements from one or more applications to read and write said one or more data elements; and
use one or more application component handles associated with a first data element of said at least one data structure in-memory representation to notify one or more respective components of said one or more applications that a change in value of said first data element has occurred.

21. The computer program product of claim 20 wherein said at least one description set comprises an extensible markup language based description set.

22. The computer program product of claim 20 wherein said computer readable program code configured to obtain at least one description set comprises computer readable program code configured to parse at least one description file.

23. The computer program product of claim 20 wherein said computer readable program code configured to obtain at least one description set comprises computer readable program code configured to analyze the hierarchical structure of said container data structure.

24. The computer readable program code of claim 20 wherein said at least one container data structure comprises computer readable program code configured to obtain a plurality of properties associated with said at least one container data structure.

25. The computer program product of claim 24 wherein said plurality of properties comprises a plurality of name-value pairs.

26. The computer program product of claim 24 wherein said plurality of properties comprises a property definition for each one of said plurality of properties.

27. The computer program product of claim 26 wherein said property definition comprises a definition for a range of valid values.

28. The computer program product of claim 26 wherein said property definition comprises a definition for a maximum value.

29. The computer program product of claim 26 wherein said property definition comprises a definition for a minimum value.

30. The computer program product of claim 26 wherein said property definition comprises a definition for a type of a variable.

31. The computer program product of claim 20 wherein said at least one container data structure comprises a hierarchical structure.

32. The computer program product of claim 20 wherein said computer readable program code configured to obtain said mapping comprises computer readable program code configured to associate at least one handler function with each of said one or more data elements.

33. The computer program product of claim 32 wherein said at least one handler function comprises at least one function for reading the value of said one or more data elements.

34. The computer program product of claim 32 wherein said at least one handler function comprises at least one function for writing the value of said one or more data elements.

35. The computer program product of claim 32 wherein said at least one handler function comprises at least one function configured to handle variable type checks of said one or more data elements.

36. The computer program product of claim 32 wherein said at least one handler function comprises at least one function configured to check access permissions to said one or more data elements.

37. The computer program product of claim 20 wherein said computer readable program code configured to handle access to said one or more data elements comprises computer readable program code configured to obtain a reference from an application accessing said one or more data element.

38. The computer program product of claim 20 wherein said computer readable program code configured to handle access to said one or more data elements comprises computer readable program code configured to notify applications when said one or more data elements are modified.

* * * * *